United States Patent
Nath et al.

(10) Patent No.: US 9,232,559 B2
(45) Date of Patent: Jan. 5, 2016

(54) SYSTEM AND METHOD TO PROVIDE DYNAMIC BEARER SELECTION FOR DATA TRANSFERS IN MULTI-BEARER WIRELESS DATA TERMINALS

(75) Inventors: Badri Nath, Edison, NJ (US); Rakesh Kushwaha, Marlboro, NJ (US)

(73) Assignee: MFORMATION Software Technologies LLC, Palo Alto, CA (US)

( * ) Notice: Subject to any disclaimer, the term of this patent is extended or adjusted under 35 U.S.C. 154(b) by 287 days.

(21) Appl. No.: 12/121,399

(22) Filed: May 15, 2008

(65) Prior Publication Data

US 2009/0286543 A1 Nov. 19, 2009

(51) Int. Cl.
- *H04W 40/00* (2009.01)
- *H04W 72/00* (2009.01)
- *H04W 88/06* (2009.01)
- *H04W 28/16* (2009.01)

(52) U.S. Cl.
CPC .............. *H04W 88/06* (2013.01); *H04W 28/16* (2013.01)

(58) Field of Classification Search
USPC ........... 455/403, 414.1, 418, 422.1, 425, 445, 455/62, 525, 435.2, 450–452.2
See application file for complete search history.

(56) References Cited

U.S. PATENT DOCUMENTS

| | | | |
|---|---|---|---|
| 6,058,312 A | 5/2000 | Kimura | |
| 7,069,008 B1* | 6/2006 | Hill | H04W 76/027 370/357 |
| 2001/0026538 A1* | 10/2001 | Bruss | H04W 28/18 370/329 |
| 2003/0211858 A1* | 11/2003 | Coan | H04W 4/12 455/515 |
| 2004/0166835 A1* | 8/2004 | Johansson | H04W 28/18 455/414.1 |
| 2005/0003822 A1* | 1/2005 | Aholainen | H04W 28/18 455/445 |
| 2005/0063355 A1 | 3/2005 | Iwamura | |
| 2005/0125483 A1 | 6/2005 | Bergander et al. | |
| 2006/0084417 A1 | 4/2006 | Melpignano et al. | |

(Continued)

FOREIGN PATENT DOCUMENTS

| | | |
|---|---|---|
| JP | H09-172430 A | 6/1997 |
| JP | 2005-532712 A | 10/2005 |
| JP | 2005-532759 A | 10/2005 |

(Continued)

OTHER PUBLICATIONS

Notification of Transmittal of the International Search Report and the Written Opinion of the International Searching Authority, or the Declaration dated Sep. 10, 2009.

(Continued)

*Primary Examiner* — Olumide T Ajibade Akonai
*Assistant Examiner* — Matthew Genack
(74) *Attorney, Agent, or Firm* — Brosemer, Kolefas & Associates, LLC

(57) ABSTRACT

A technique to automatically select a bearer from among a plurality of bearers available on a wireless device bases the selection of the bearer on which a data transfer takes place on a cost function that is used both by the server and the wireless device. A method for communicating data with a mobile device capable of communicating using a plurality of communication bearers comprises selecting a communication bearer to opportunistically initiate a data transfer between a server and the mobile device using a cost function and a policy table to select the communication bearer, from among the plurality of communication bearers, and when the selected communication bearer is or becomes available, initiating the transfer between the server and the mobile device using the selected communication bearer.

26 Claims, 7 Drawing Sheets

(56) References Cited

U.S. PATENT DOCUMENTS

| | | | |
|---|---|---|---|
| 2006/0133307 A1* | 6/2006 | Fukasawa | H04L 41/0816 370/328 |
| 2009/0240910 A1* | 9/2009 | Inomata | G06F 3/0605 711/171 |

FOREIGN PATENT DOCUMENTS

| | | |
|---|---|---|
| JP | 2007-325190 A | 12/2007 |
| WO | 01/63946 | 8/2001 |
| WO | WO 01/63946 A1 | 8/2001 |
| WO | 03/084273 A | 10/2003 |

OTHER PUBLICATIONS

International Preliminary Report on Patentability and Written Opinion of the International Searching Authority dated Nov. 25, 2010 for application No. PCT/US2009/044103.

European Patent Office, Communication pursuant to Article 94(3) EPC, Application No. 09747659.2, Jul. 9, 2013.

JPO, Office Action issued in Japanese Patent Application No. 2011-509731, dated Sep. 2, 2013.

* cited by examiner

SYSTEM AND METHOD TO PROVIDE DYNAMIC BEARER SELECTION FOR DATA TRANSFERS IN MULTI-BEARER WIRELESS DATA TERMINALS

BACKGROUND OF THE INVENTION

1. Field of the Invention

The present invention relates to a method and system for choosing a bearer from a plurality of bearers for the purpose of exchanging content between a server and a wireless device, is based on the use of a cost function and is exchanged between the server and the wireless device.

2. Description of the Related Art

Existing wireless devices typically have one wireless bearer over which data transfer takes place. Examples include, but are not limited to, Global System for Mobile communications (GSM), General Packet Radio Service (GPRS), Evolution-Data Optimized or Evolution-Data only (EVDO), Worldwide Interoperability for Microwave Access (WIMAX), 3rd Generation Partnership Project Long Term Evolution (3GPP-LTE or LTE), etc. For content exchange, devices are configured to provide access to the network using the available bearer. Since there is only one bearer, the data transfer takes place over this bearer provided the bearer is configured properly.

However, there are devices that are appearing in the market that support multiple bearers. These dual-mode, tri-mode and even multi-mode devices support two, three and multiple bearers, and the user can choose one among the many bearers for initiating data transfer. Examples include, but not limited to are GPRS and Wireless Local Area Network (WLAN or Wi-Fi); WiMAX and WLAN; WiMAX and EVDO; WiMAX, WLAN, and EVDO; WLAN, Bluetooth, and Code Division Multiple Access (CDMA) etc. In general, any combination of bearer technologies can be supported in a device. Existing techniques include manually prioritizing the choices through a user interface or a configuration manager. The problem is one of choosing the right bearer for initiating data transfer.

Manually selecting a bearer for a particular data transfer is not desirable and requires some amount of knowledge about the each of the bearer characteristics. Instead, a need arises for a technique by which a bearer may be automatically chosen from among a plurality of bearers. Similarly, when a server wants to transfer content to the wireless device, it also needs to know the bearer to use.

Thus, there is a need to provide a mechanism by which a bearer, from among a set of available bearers, can be automatically selected by the device or the server to initiate a data transfer.

SUMMARY OF THE INVENTION

A technique to automatically select a bearer from among a plurality of bearers available on a wireless device bases the selection of the bearer on which a data transfer takes place on a cost function that is used both by the server and the wireless device.

The cost function and the current set of available bearers available to the device are communicated to the server. The server then uses the cost function and, based on the size of the data, initiates the data transfer. This requires a mapping function that associates each bearer with a cost and the device or the server uses this function in a policy decision of which bearer to use.

For example, the bearers may be prioritized based on a cost function that can be computed at the device. This may include using local parameters such as bearer availability, cost of using the bearer and the size of the data transfer.

A policy table may be used that maps the range of the cost function associated with each bearer to the identity of the bearer that will be used by the device and the server to initiate a data transfer.

The communication of the available bearer information may be sent to the content server. When the server has content to download to the device, the server can request the device to convey the bearer information to the server.

A default or available bearer may be used for initiating data transfer when the best bearer is not available for a given period of time.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
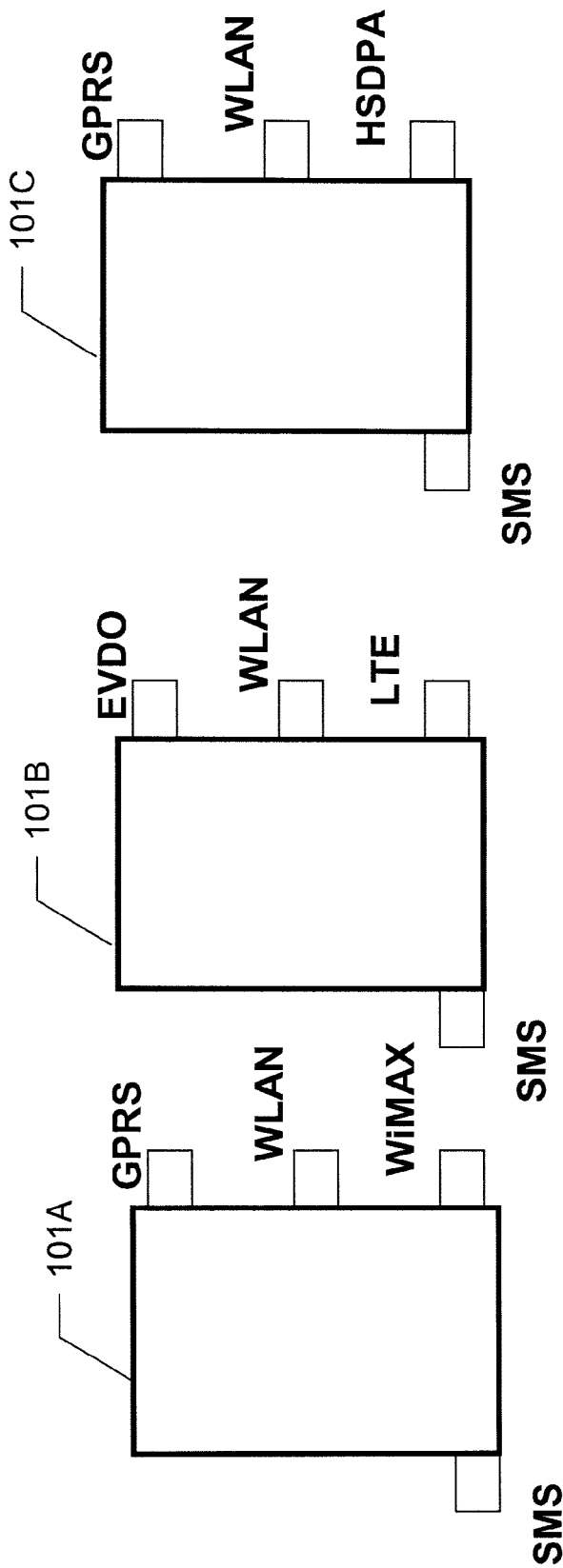
FIG. 1 is an exemplary diagram illustrating multi-bearer devices in which opportunistic data transfer may be implemented

FIG. 1 is a diagram illustrating a plurality of multi-bearer devices 101A, 101B, and 101C. Typically, wireless devices have one wireless link over which data is sent or received. Examples include mobile phones with General Packet Radio Service (GPRS), Code Division Multiple Access (CDMA), Evolution-Data Optimized or Evolution-Data only (EVDO), High-Speed Downlink Packet Access (HSDPA) and/or many of the wireless links that are built as part of the device. Recently, devices with more than one wireless link are becoming available. For example, device 101A includes GPRS, WLAN, WiMAX, and Short Message Service (SMS) wireless links, device 101B includes EVDO, WLAN, 3rd Generation Partnership Project Long Term Evolution (3GPP-LTE or LTE), and SMS wireless links, and device 101C includes GPRS, WLAN, HSDPA, and SMS wireless links. Such devices, which include mobile phones, that have wide area wireless links have multiple wireless interfaces, any one of which can be used for data transfer (voice or other data) between the device and a server.

These wireless interfaces are also known as bearers. A data connection can be initiated by using any of the bearers provided a corresponding access point in the core network (203 of FIG. 2) is in range. Further, these bearers provide different capabilities in terms of bandwidth, range, cost and availability. Hence, when initiating a data transfer it is desirable to choose the best bearer available to initiate a data transfer.

Figure 2:
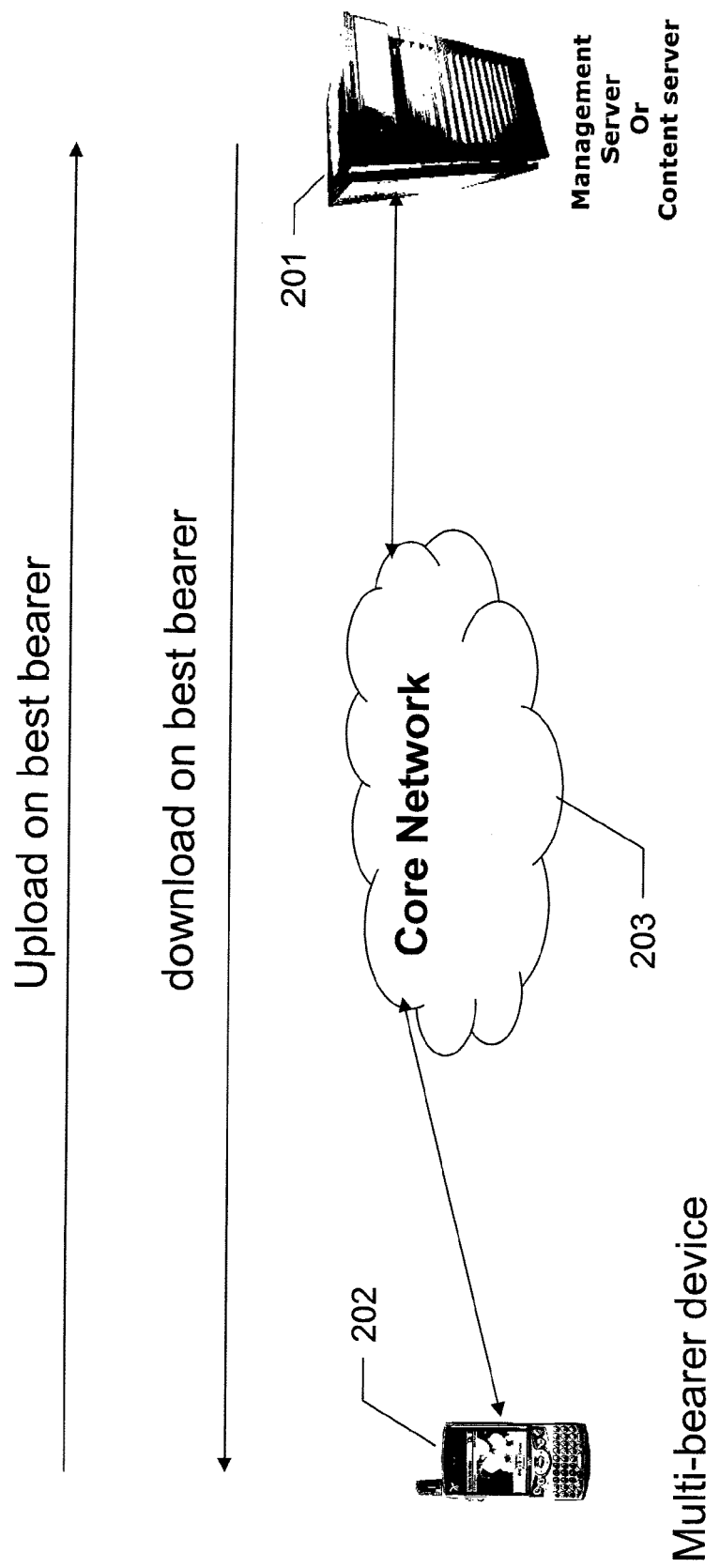
FIG. 2 is an exemplary diagram illustrating an architecture in which opportunistic data transfer using a device management server or a content server may be implemented.

Similarly, a server may also want to initiate a data transfer to the wireless device. FIG. 2 illustrates an example in which the data transfer is initiated from a server 201 to a device 202 or from the device 202 to the server 201. The server may be a content server or a device management server which is authorized to download data to a device. The server needs to know the best bearer to use for data transfer to a particular device. This information can be conveyed from the device, or the server may request the device to provide the information. The device may notify the server when the bearer becomes available or the server may monitor for the availability of a given bearer on the wireless device.

Figure 3:
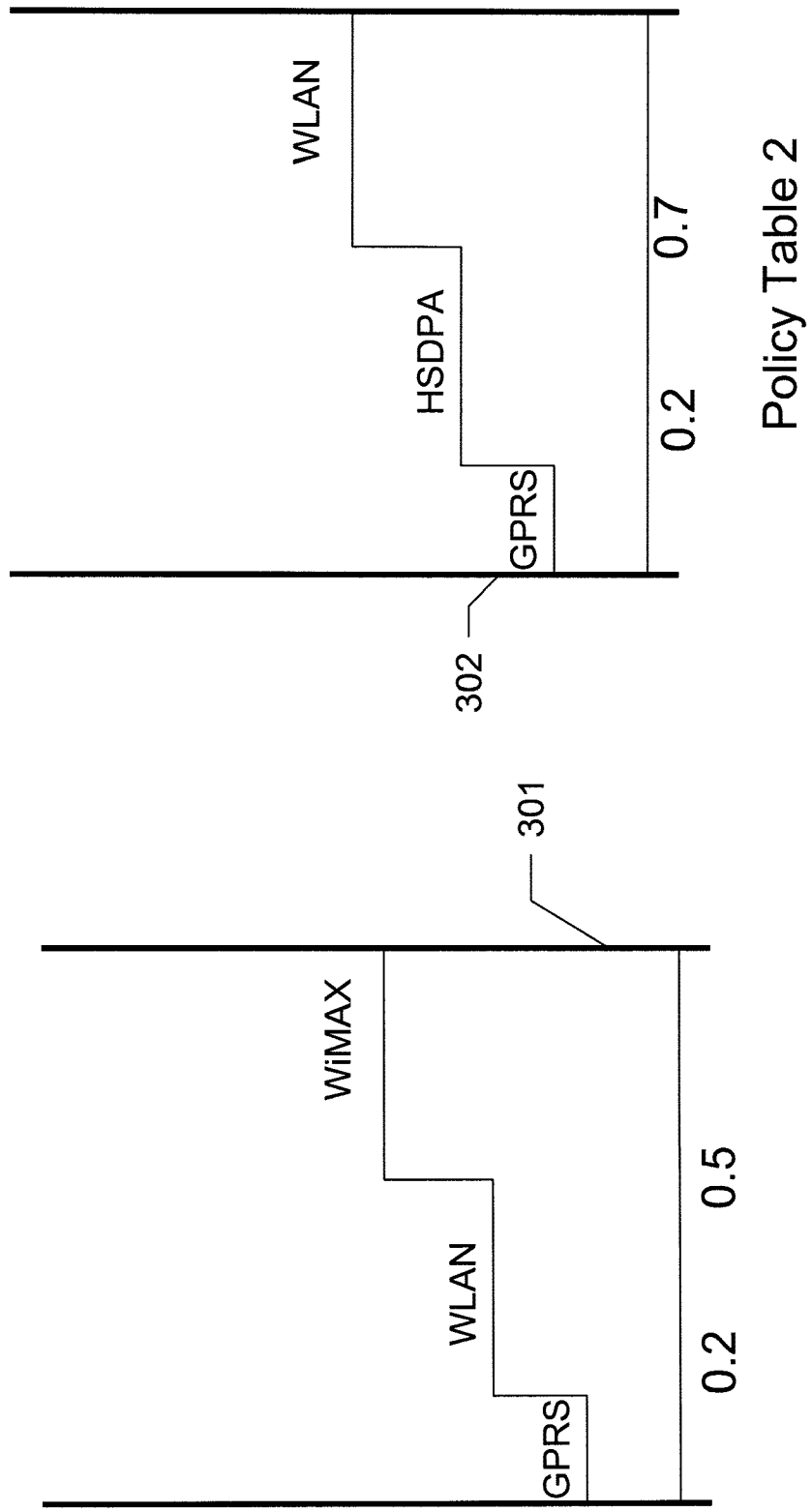
FIG. 3 is an exemplary diagram illustrating policy tables that may used to determine a best bearer to use for a data transfer.

FIG. 3 is a diagram illustrating examples of policy tables 301 and 302 that may be used by the device to determine the best bearer to initiate the data transfer. A cost function that uses as parameters the size of the data transfer or file, the bearer bandwidth, and the cost of using the bearer produces a normalized value between 0 and 1. A policy table maps the range of the values of the cost function to a given bearer. There is a policy table for each device and the make up of the table will depend on the bearers supported by each device. The policy table may be stored in the device at time of manufacture or the policy table may be determined by an external entity such as the user or a management server. In the case in which the user determines the policy table, the values for each bearer may be configured manually by the user. The policy table may also be communicated by a device management server to the device. In either case, the device uses the policy table to rank the bearers so that the best bearer may be chosen to initiate a data transfer.

The cost function takes into account the bandwidth of each bearer, the range in the size of the data transfer and the cost of the transfer, if any, for that bearer to determine the cost of that bearer. An example of a cost function that may be used is $Fb=[(Cost/Unit\ of\ time)*(Size\ of\ data/Bandwidth\ of\ bearer)]$. The normalized cost Function is computed by dividing the cost of each bearer by the sum of the costs for each bearer. For example, if a device has three bearers B1, B2, and B3 with costs Fb1, Fb2, and Fb3 respectively, then the normalized cost would be $FNb1=Fb1/(Fb1+Fb2+Fb3)$. Depending on the range of the cost function, a policy table can decide which range maps to which bearer.

Figure 4:
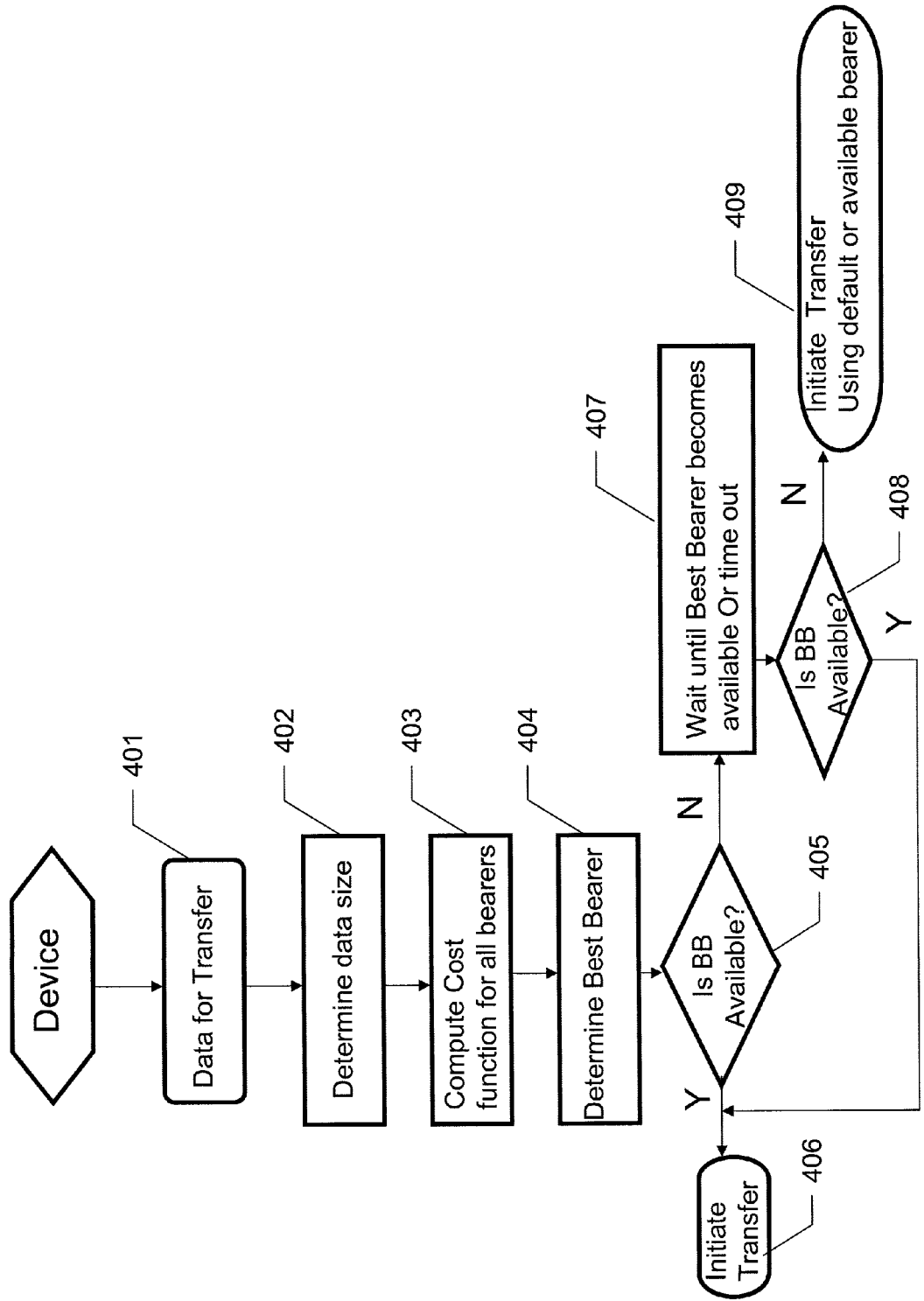
FIG. 4 is an exemplary flow diagram illustrating a process of initiating an opportunistic data transfer at a mobile device.

FIG. 4 is an exemplary flow diagram that illustrates a process of initiating an opportunistic data transfer at a mobile device. The application that initiates the data transfer, in step 401, uses the opportunistic method to initiate data transfer. In step 402, the size of the data transfer is determined. In step 403, using the size of the data transfer determined in step 402 as one of the parameters, the application computes the value of the cost function for each bearer and from the policy table, such as those shown in FIG. 3, and determines the best bearer for the transfer. In step 405, it is determined whether the best bearer determined in step 404 is available. If the best bearer is available, then in step 406, the application initiates the data transfer to the desired content or device management server.

If the bearer determined by the policy table is not available, then in step 407, the application waits for a fixed amount of time while, in step 408, determining whether the best bearer has become available. If the best bearer is not available, then in step 409, the transfer is initiated using a default bearer or any available bearer. However, if the best bearer has become available during the wait period, then in step 406 the application uses the best bearer to initiate the data transfer to the desired server.

Figure 5:
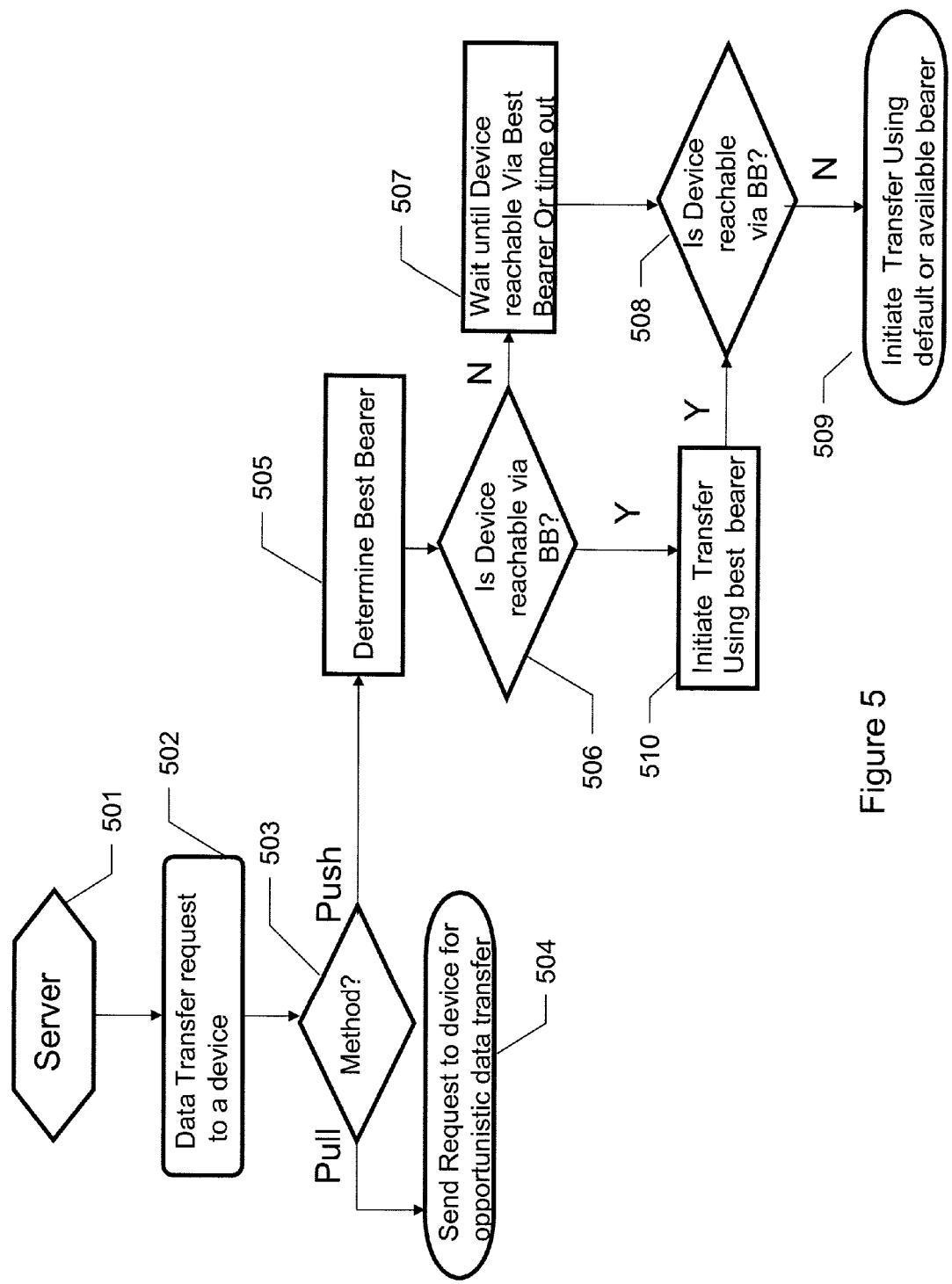
FIG. 5 is an exemplary flow diagram illustrating process of initiating an opportunistic data transfer from a server to a mobile device.

FIG. 5 is an exemplary flow diagram that illustrating a process of initiating an opportunistic data transfer from a server to a mobile device. A server 501, such as a content server or device management server, in step 502, initiates a data transfer to a device. In step 503, it is determined whether the data transfer to be used is a pull method or a push method. In the pull method, in step 504, the server just informs the device to use the opportunistic method of download from the server. From this point on, the device uses the same method as described in the steps of FIG. 4.

In the push method, in step 505, the server determines the best bearer for the device from a stored policy table or sends a request to the device to determine the best bearer. The device can either send the policy table as well as the availability of the bearers and connectivity information or just inform the server of the best bearer to use for initiating data transfer. Should, in step 506, the connectivity attempt using best bearer fail, then in step 507, the server retries a predetermined number of times or for a predetermined time period. If, in step 508, the device is still not reachable using the best bearer, then in step 509, the server initiates the data transfer using uses a default bearer or any available bearer. If in step 506 or step 508 the device is reachable using the best bearer, then in step 510, the server initiates the data transfer using uses the best bearer.

Figure 6:
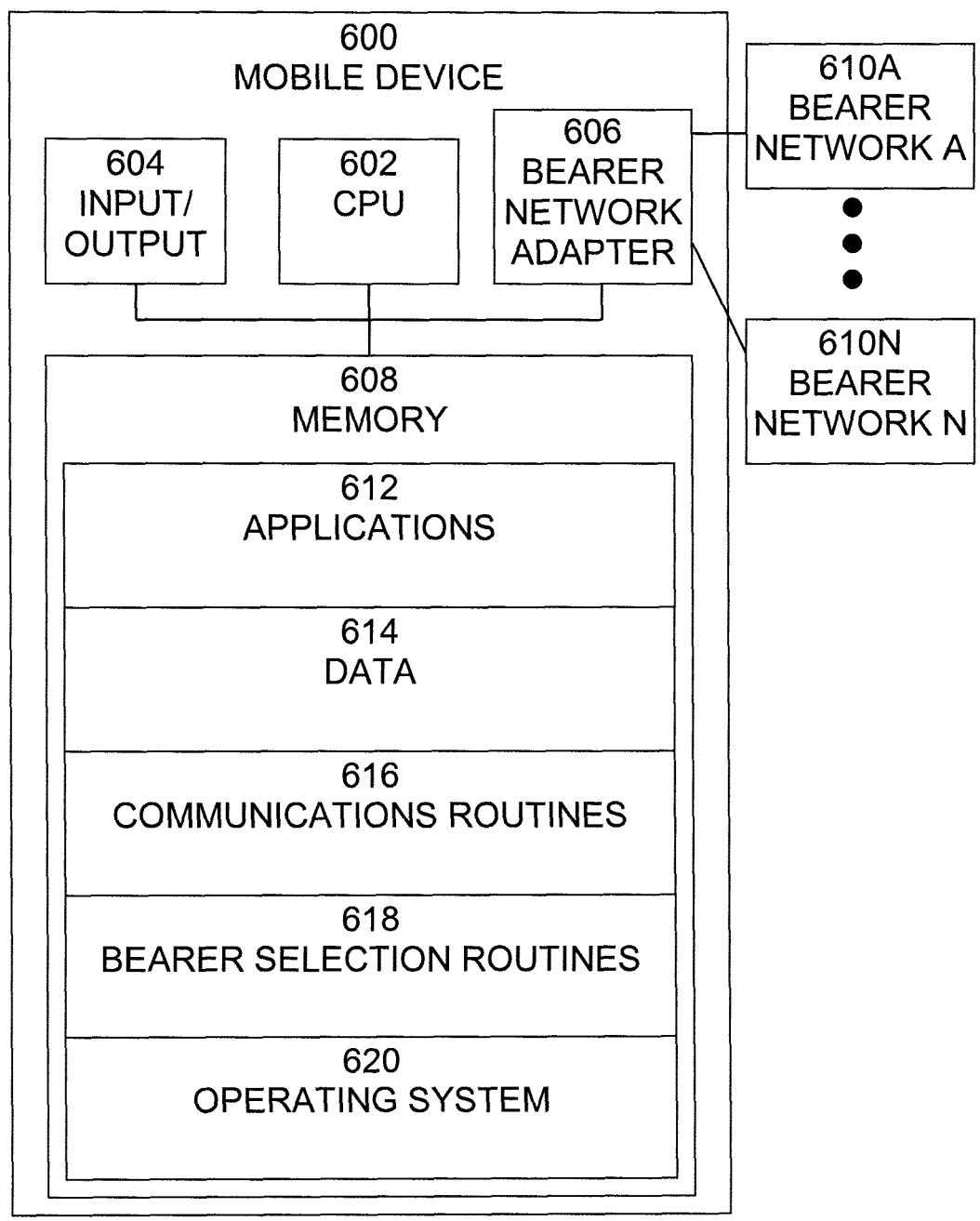
FIG. 6 is an exemplary block diagram of a multi-bearer mobile device in which the present invention may be implemented.

An exemplary block diagram of a multi-bearer mobile device 600 in which the present invention may be implemented is shown in FIG. 6. Device 600 is typically a wireless communication and/or computation device, such as a mobile phone, personal digital assistant, personal computer, and the like. Device 600 includes processor (CPU) 602, input/output circuitry 604, network adapter 606, memory 608, and bearer networks 610A-N. CPU 602 executes program instructions in order to carry out the functions of the present invention. Typically, CPU 602 is an embedded microprocessor, such as an INTEL PENTIUM® processor, but may also be a microcomputer or other embedded processing device. Although in the example shown in FIG. 6, device 600 is a single processor system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which device 600 is implemented on a plurality of networked computer systems, which may be single-processor computer systems, multi-processor computer systems, or a mix thereof.

Input/output circuitry 604 provides the capability to input data to, or output data from, device 600. For example, input/output circuitry may include input devices, such as keyboards, mice, touchpads, trackballs, scanners, etc., output devices, such as video adapters, monitors, printers, etc., and input/output devices, such as, modems, etc. Bearer network adapter 606 interfaces device 600 with a plurality of bearer networks 610A-N. Bearer networks 610A-N may be any standard bearer network or WLAN, such as GSM, GPRS, EVDO, WiMAX, LTE, Wi-Fi, CDMA, etc., or a private or proprietary bearer network.

Memory 608 stores program instructions that are executed by, and data that are used and processed by, CPU 602 to perform the functions of the present invention. Memory 608 may include volatile memory, including electronic memory devices such as random-access memory (RAM), and non-volatile memory, including electronic memory devices such as read-only memory (ROM), programmable read-only memory (PROM), electrically erasable programmable read-only memory (EEPROM), flash memory, etc. Memory 608 may also include mass storage that provides the capability to store large amounts of information, such as program instructions and data, in a persistent and accessible form. Mass storage typically includes electro-mechanical storage devices, such as magnetic disk drives, tape drives, optical disk drives, etc., which may use an integrated drive electronics (IDE) interface, or a variation or enhancement thereof, such as enhanced IDE (EIDE) ultra direct memory access (UDMA), or Serial Advanced Technology Attachment (SATA), or a small computer system interface (SCSI) based interface, or a variation or enhancement thereof, such as fast-SCSI, wide-SCSI, fast and wide-SCSI, etc, or a fiber channel-arbitrated loop (FC-AL), etc. Mass storage may also include electronic memory devices, which are typically non-volatile devices, such as those described above, but which also may be volatile memory devices.

Memory 608 includes applications 612, data 614, communications routines 616, bearer selection routines 618, and operating system 620. Applications 612 provide functionality to device 600 and may include applications that interact with a user of the device, applications that communicate and/or process information, and any other type of application. Data 614 is information that is read, processed, and stored by applications 614. Communications routines are software routines that are typically used by applications 612 to communicate information to and from device 600. Bearer selection routines 618 are software routines that are used by applications 612 and/or communications routines to select a bearer to be used for a data transfer. Bearer selection routines 618 implement the processes shown in FIGS. 4 and/or 5. Operating system 620 provides overall system functionality.

Figure 7:
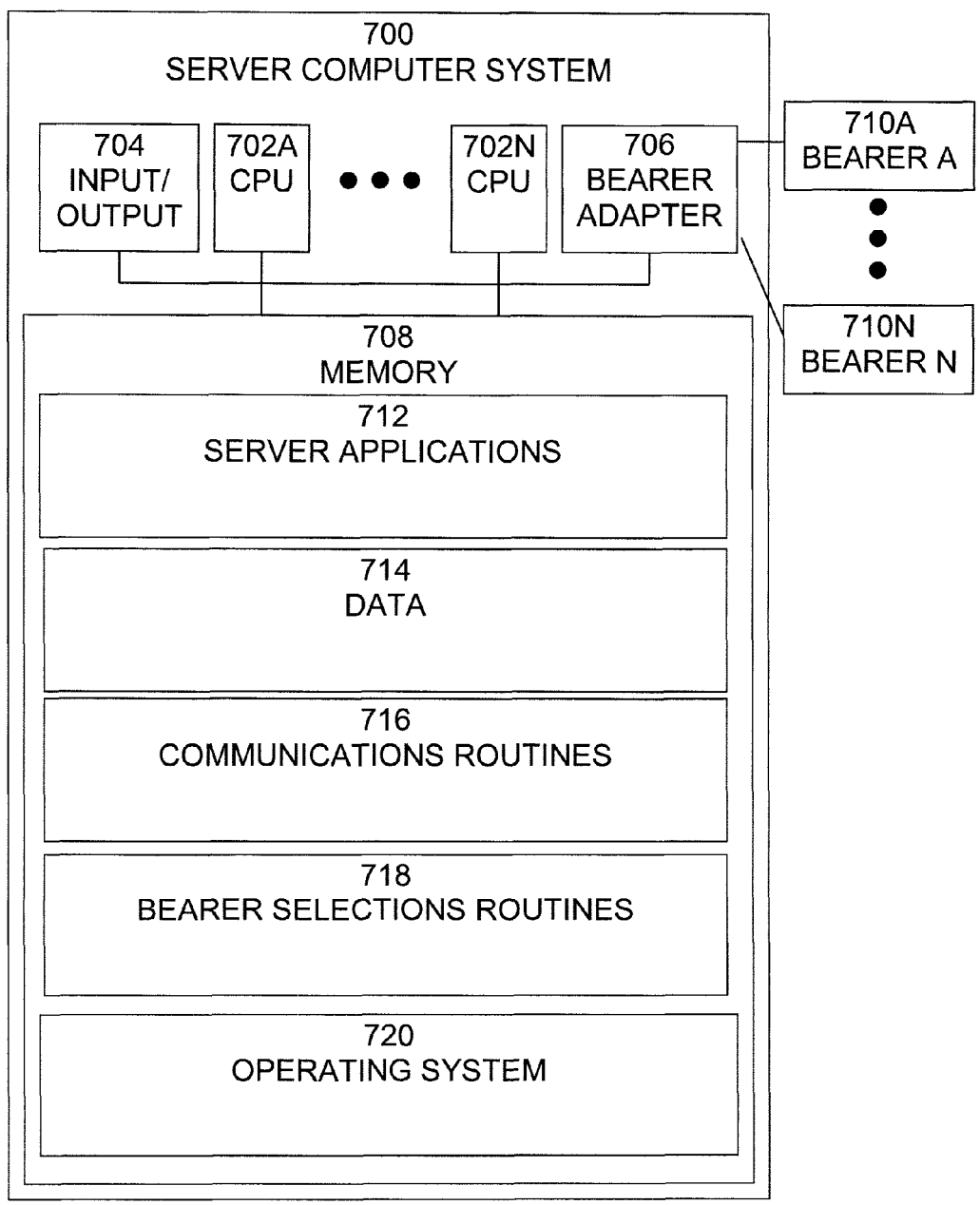
FIG. 7 is an exemplary block diagram of server computer system, such as a content server or a device management server, in which the present invention may be implemented.

An exemplary block diagram of a server computer system 700, such as a content server or a device management server, shown in FIG. 2, is shown in FIG. 7. Server 700 is typically a programmed general-purpose computer system, such as a personal computer, workstation, server system, and mini-computer or mainframe computer. Server 700 includes one or more processors (CPUs) 702A-302N, input/output circuitry 704, network adapter 706, and memory 708. CPUs 702A-302N execute program instructions in order to carry out the functions of the present invention. Typically, CPUs 702A-202N are one or more microprocessors, such as an INTEL PENTIUM® processor. FIG. 7 illustrates an embodiment in which Server 700 is implemented as a single multi-processor computer system, in which multiple processors 702A-202N share system resources, such as memory 708, input/output circuitry 704, and network adapter 706. However, the present invention also contemplates embodiments in which server 700 is implemented as a plurality of networked computer systems, which may be single-processor computer systems, multi-processor computer systems, or a mix thereof.

Input/output circuitry 704 provides the capability to input data to, or output data from, database/server 700. For example, input/output circuitry may include input devices, such as keyboards, mice, touchpads, trackballs, scanners, etc., output devices, such as video adapters, monitors, printers, etc., and input/output devices, such as, modems, etc. Bearer network adapter 706 interfaces device 700 with a plurality of bearer networks 710A-N. Bearer networks 710A-N may be any standard bearer network or WLAN, such as GSM, GPRS, EVDO, WiMAX, LTE, Wi-Fi, CDMA, etc., or a private or proprietary bearer network.

Memory 708 stores program instructions that are executed by, and data that are used and processed by, CPU 702 to perform the functions of server 700. Memory 708 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 708 varies depending upon the function that server 700 is programmed to perform. In the example shown in FIG. 7, memory contents that would be included in Web server 106, search engine 108, and recommendation system 10 are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 7, memory 708 includes server applications 712, data 714, communications routines 716, bearer selection routines 718, and operating system 720. Server applications 712 include software that implements the functionality of sever 700. This functionality includes receiving requests for information from other systems and transmitting the requested information. Server data 714 includes the information that might be requested, as well as other information that is read, processed, and stored by applications 714. Communications routines are software routines that are typically used by applications 712 to communicate information to and from device 600. Bearer selection routines 718 are software routines that are used by applications 712 and/or communications routines to select a bearer to be used for a data transfer. Bearer selection routines 718 implement the processes shown in FIGS. 4 and/or 5. Operating system 720 provides overall system functionality.

As shown in FIG. 7, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for communicating data with a mobile device capable of communicating using a plurality of communication bearers, the method comprising:
    selecting a communication bearer to be used by the mobile device, which communication bearer is not currently available, to opportunistically initiate a data transfer between a server and the mobile device using a cost function that associates each bearer with a cost and a policy table that maps the range of the cost function associated with each bearer to the identity of the bearer, the cost function and the policy table having been communicated between the server and the mobile device for use in selecting the communication bearer from among the plurality of communication bearers,
    waiting for the selected communication bearer to become available, and
    when the selected communication bearer becomes available, initiating the data transfer between the server and the mobile device using the selected communication bearer.

2. The method of claim 1, wherein the policy table is maintained at the mobile device and is communicated to the server.

3. The method of claim 2, wherein the communication bearer is selected at the device.

4. The method of claim 3, wherein the communication bearer is selected at the server.

5. The method of claim 1, wherein the policy table is maintained at the server and is communicated to the device.

6. The method claim 5, wherein the communication bearer is selected at the server.

7. The method claim 5, wherein the communication bearer is selected at the device.

8. The method of claim 1, wherein the data to be transferred resides at the server and is pulled by the device using the selected communication bearer.

9. The method of claim 1, wherein the data resides at the server and is pushed to the device using the selected communication bearer.

10. The method of claim 1, wherein the cost function is based on at least one of the size of the data transfer, the communication bearer bandwidth and the cost of using the communication bearer.

11. The method of claim 1, further comprising:
    determining that the selected communication bearer is not available for a determined time period; and
    in response, initiating the data transfer using an available communication bearer.

12. The method of claim 1, further comprising:
    determining that the selected communication bearer is not available for a determined time period; and
    in response, initiating the data transfer using a default communication bearer.

13. The method of claim 1, wherein an available communication bearer is selected by the mobile device.

14. A computer program product for communicating data with a mobile device capable of communicating using a plurality of communication bearers, comprising:
    a non-transitory computer readable storage medium; and
    computer program instructions, recorded on the non-transitory computer readable storage medium, executable by a processor, for performing the steps of:
    selecting a communication bearer to be used by the mobile device, which communication bearer is not currently available, to opportunistically initiate a data transfer between a server and the mobile device using a cost function that associates each bearer with a cost and a policy table that maps the range of the cost function associated with each bearer to the identity of the bearer, the cost function and the policy table having been communicated between the server and the mobile device for use in selecting the communication bearer from among the plurality of communication bearers,
    waiting for the selected communication bearer to become available, and
    when the selected communication bearer becomes available, initiating the data transfer between the server and the mobile device using the selected communication bearer.

15. The computer program product of claim 14, wherein the policy table is maintained at the mobile device and is communicated to the server.

16. The computer program product of claim 15, wherein the communication bearer is selected at the device.

17. The computer program product of claim 15, wherein the communication bearer is selected at the server.

18. The computer program product of claim 14, wherein the policy table is maintained at the server and is communicated to the device.

19. The computer program product claim 18, wherein the communication bearer is selected at the server.

20. The computer program product claim 18, wherein the communication bearer is selected at the device.

21. The computer program product of claim 14, wherein the data to be transferred resides at the server and is pulled by the device using the selected communication bearer.

22. The computer program product of claim 14, wherein the data resides at the server and is pushed to the device using the selected communication bearer.

23. The computer program product of claim 14, wherein the cost function is based on at least one of the size of the data transfer, the communication bearer bandwidth and the cost of using the communication bearer.

24. The computer program product of claim 14, further comprising:
    determining that the selected communication bearer is not available for a determined time period; and
    in response, initiating the data transfer using an available communication bearer.

25. The computer program product of claim 14, further comprising:
    determining that the selected communication bearer is not available for a determined time period; and
    in response, initiating the data transfer using a default communication bearer.

26. The computer program product of claim 14, wherein an available communication bearer is selected by the mobile device.

* * * * *